Patented Dec. 3, 1929

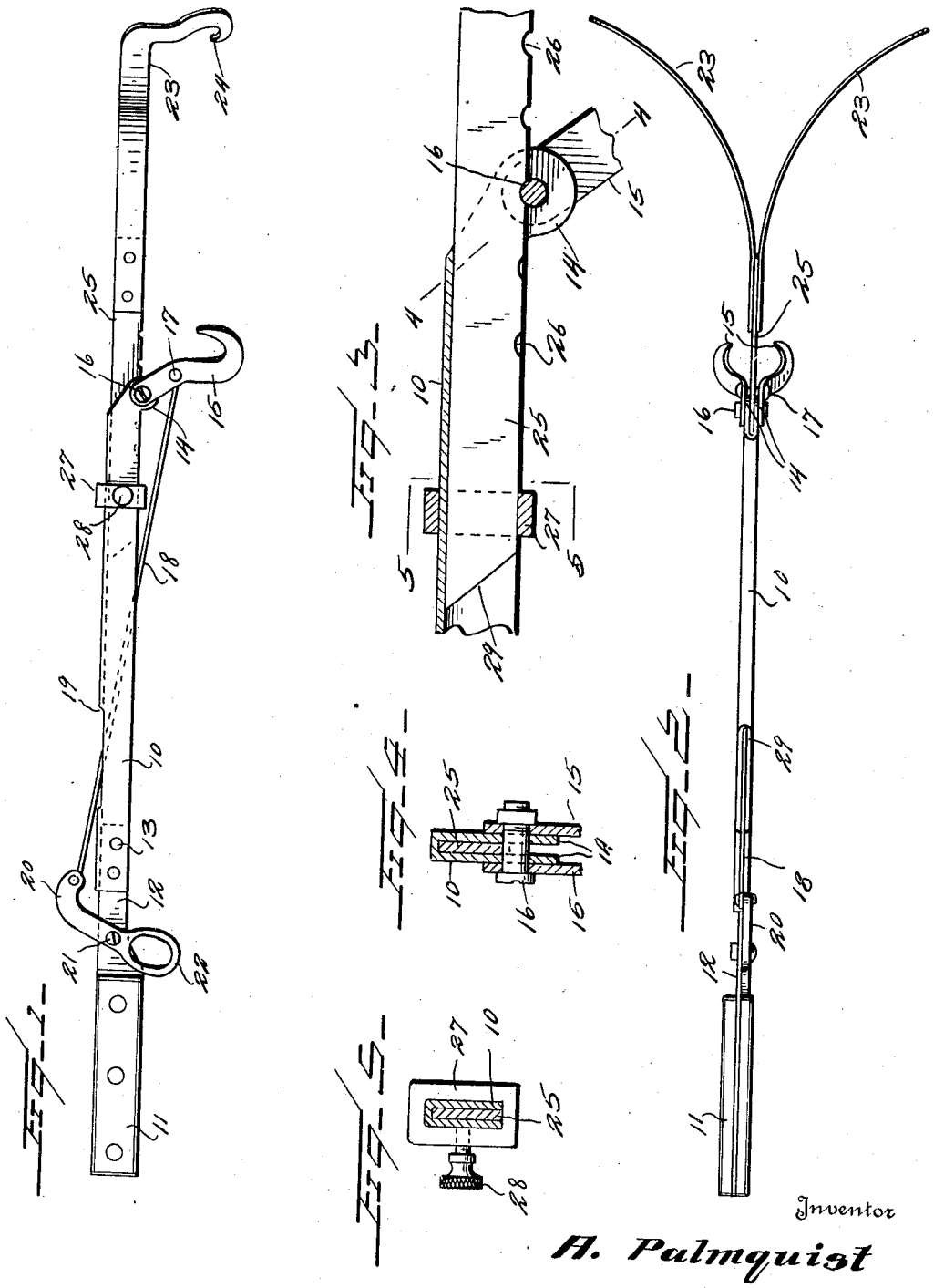

1,737,769

UNITED STATES PATENT OFFICE

ANDREW PALMQUIST, OF SPOKANE, WASHINGTON, ASSIGNOR OF ONE-HALF TO ERNEST J. PALMQUIST, OF HELENA, MONTANA

ADJUSTABLE POT LIFTER

Application filed March 27, 1928. Serial No. 265,184.

This invention relates to lifting devices, and particularly to devices for lifting pans, pots, pot lids and the like.

The general object of the invention is to provide a very simple device of this character which is adapted for the purpose of lifting pots and pans off hot stoves or otherwise handling them, and which is so constructed that the gripping jaws of the lifter may be operated by one finger of the hand grasping the lifter.

A further object is to provide a device of this character which is adjustable to different size pots and pans.

My invention is illustrated in the accompanying drawing, wherein:—

Figure 1 is a side elevation of a pot lifter constructed in accordance with my invention;

Figure 2 is a top plan view thereof;

Figure 3 is a fragmentary longitudinal sectional view thereof;

Figure 4 is a section on the line 4—4 of Figure 3;

Figure 5 is a section on the line 5—5 of Figure 3.

Referring to these figures, 10 designates the shank of the lifter which is formed of sheet metal of proper thickness to be rigid and is bent over upon itself to form an inverted U-shaped shank, as disclosed in Figure 5. A handle 11 is provided at one end having a tang 12 which is inserted within the U-shaped shank and riveted thereto by the rivets 13. The extremity of the shank is formed with two depending ears 14, to which are pivoted the hooks 15. There are two of these hooks, the pivotal ends of the hooks being disposed exterior to the ears and pivoted thereto by the transverse pivot pin 16. The hooks are inclined toward each other and secured by a screw or rivet 17 and then diverge away from each other, the bills of the hooks being presented forward.

Pivotally connected to the pivot pin 17 is a rod 18 which extends rearward and up between the two folds of the shank 10 and out through an aperture 19. This rod is connected to a lever 20 which is pivoted at 21 to the tang 12, and the lower end of this lever is provided with the finger hold 22.

The jaws which are opposed to the jaws 15 are designated 23, these jaws being divergent in plan and then extending downward and inward to form the hooks 24 which, as before stated, are opposed to the hooks 15. The inner ends of the jaws 23 converge and are riveted to a tang 25 which is formed on its under edge with a series of recesses 26. This tang 25 is shiftable or adjustable longitudinally within the folded shank 10 and the notches 26 are adapted to rest upon the pivot bolt or screw 16.

The tang 25 is held in its adjusted position by means of a rectangular collar 27 which embraces the shank 10 and is provided with a set screw 28 which, when turned home, forces the two side walls of the shank 10 against the tang 25 and locks the tang in its adjusted position against longitudinal movement, the outer end of the tang being held from any downward movement by resting against the pivot pin 16. The tang is preferably angularly cut away at its inner end, as at 29.

In the use of this device, the tang 25 is adjusted within the shank 10 so as to dispose the jaws 23 a proper distance from the jaws 15 to accommodate the pot to be lifted, then the hooks 24 are engaged with the pot and then the operator pulls with his finger upon the lower end of the lever 20, which throws the jaws 15 toward the jaws 24, securely clamping the pot in place beneath the rim thereof and permitting the pot to be raised or lowered or shifted to any desired position. The jaws 23 may be readily adjusted toward or from the jaws 15 to accommodate any size of pot or lid or other utensil with which the lifter is intended to be used. The device is very simple, may be cheaply made, and is of sufficient length to permit the pots to be readily handled over a hot stove.

Attention is called to the fact that when the two pairs of hooks catch on the flange of the pan, the finger lever may be released and the hooks will hold and support the pan while it is being lifted or shifted. It will be seen that my construction provides generally speaking a shank 10 having a handle 11, a pair of hooks 15 which are pivoted to the shank, means being provided whereby the hooks may be retracted toward the handle or forced away therefrom and that there are a second pair of hooks 24 operatively supported upon the shank by means of the tang 25 and that this second pair of hooks is adjustable bodily toward or from the first named hooks.

I claim:—

1. A lifter of the character described comprising a shank having a handle, hooks pivoted to the shank, means mounted upon the handle whereby the hooks may be retracted or forced forward, and hooks supported by the shank and confronting the first named hooks, the last named hook being adjustable toward or from the first named hooks.

2. A lifter of the character described comprising a shank having a handle, hooks pivoted to the shank, means mounted upon the handle whereby the hooks may be retracted or forced forward, and hooks supported by the shank and confronting the first named hooks, the last named hooks being provided with a tang having telescopic engagement with the shank whereby the last named hooks may be shifted toward or from the first named hooks, and means on the shank whereby the tang may be clamped in any adjusted position.

3. A lifter of the character described comprising a hollow shank, a pivot pin passing through the shank at one end thereof, the opposite end of the shank having a handle, a pair of hooks pivotally mounted upon the pivot pin, means on the handle whereby the hooks may be retracted or forced forward, a pair of hooks opposed to the first named hooks and disposed in divergent relation to each other and having a single tang shiftable longitudinally within the shank, and a collar mounted upon the shank and having a set screw whereby the walls of the shank may be forced inward upon the tang to thereby hold the tang in adjusted position.

4. A lifter of the character described comprising a hollow shank, a pivot pin passing through the shank at one end thereof, the opposite end of the shank having a handle, a pair of hooks pivotally mounted upon the pivot pin, means on the handle whereby the hooks may be retracted or forced forward, a pair of hooks opposed to the first named hooks and disposed in divergent relation to each other and having a single tang shiftable longitudinally within the shank, and a collar mounted upon the shank and having a set screw whereby the walls of the shank may be forced inward upon the tang to thereby hold the tang in adjusted position, the lower edge of the tang being formed with notches engageable with the pivot of the first named hooks.

5. A lifter of the character described comprising a shank having a handle at one end, the shank being U-shaped in cross section and opening downward and being formed at its outer end remote from the handle with a pair of depending lugs, a pair of hooks pivoted to said lugs, a lever mounted upon the shank adjacent the handle and having a finger hold, a connecting rod between said lever and the hooks, a pair of divergently related hooks confronting the first named hooks, a tang to which said hooks are connected, the tang having shiftable engagement within the folded shank, and means for locking the tang in any adjusted position with relation to the shank.

In testimony whereof I hereunto affix my signature.

ANDREW PALMQUIST.